United States Patent [19]
Temme

[11] Patent Number: 5,857,847
[45] Date of Patent: Jan. 12, 1999

[54] BRAZING FURNACE PARTS FEEDING CONTROL

[75] Inventor: John D. Temme, Toledo, Ohio

[73] Assignee: Chrysler Corporation, Auburn Hills, Mich.

[21] Appl. No.: 842,805

[22] Filed: Apr. 17, 1997

[51] Int. Cl.⁶ .................................................. F27D 19/00
[52] U.S. Cl. ................................ 432/51; 432/55; 432/36
[58] Field of Search .................................. 432/34, 36, 39, 432/45, 51, 55

[56] References Cited

U.S. PATENT DOCUMENTS

| | | |
|---|---|---|
| 1,951,426 | 3/1934 | Littler . |
| 3,149,192 | 9/1964 | Schuerger et al. . |
| 3,152,794 | 10/1964 | Alexeff et al. . |
| 3,194,546 | 7/1965 | Schuerger et al. . |
| 3,252,693 | 5/1966 | Nelson . |
| 3,548,171 | 12/1970 | Kodz . |
| 3,622,140 | 11/1971 | Schwatku et al. . |
| 3,695,594 | 10/1972 | Hollander . |
| 4,004,138 | 1/1977 | Morooka et al. . |
| 4,178,151 | 12/1979 | Huestis ........................................ 432/36 |
| 4,223,385 | 9/1980 | Miller et al. ............................... 432/51 |
| 4,373,364 | 2/1983 | Tanimoto et al. . |
| 4,501,552 | 2/1985 | Wakamiya . |
| 4,554,437 | 11/1985 | Wagner et al. ............................ 432/45 |
| 4,577,278 | 3/1986 | Shannon . |
| 4,606,006 | 8/1986 | Kitao et al. . |
| 4,606,529 | 8/1986 | Tooch . |
| 4,886,449 | 12/1989 | Brittin . |
| 4,982,347 | 1/1991 | Rackerby et al. . |
| 5,003,160 | 3/1991 | Matsuo et al. . |
| 5,187,670 | 2/1993 | Keil et al. ................................. 432/51 |
| 5,209,881 | 5/1993 | Charbonnet . |
| 5,231,645 | 7/1993 | Uno et al. . |
| 5,413,164 | 5/1995 | Teshima et al. .......................... 432/34 |

*Primary Examiner*—Teresa J. Walberg
*Assistant Examiner*—Gregory A. Wilson
*Attorney, Agent, or Firm*—Roland A. Fuller, III

[57] ABSTRACT

A method of controlling the feeding of part trays into a roller-hearth brazing furnace includes feeding a part tray into the furnace after the expiration of a time period. The temperatures in each heating zone of the furnace are monitored. After the expiration of the time period and before a part tray is fed into the furnace, these temperatures are compared to a specified temperature range for each zone. If all temperatures within the heating zones are within specification, the time period is decremented by a small amount. This process continues automatically until a temperature in a heating zone is not within specification when the time period expires. When this occurs, the time period is incremented by a small amount, which can be different from or the same as the amount used to decrement the time period. This method allows the furnace to run at higher throughput, approaching maximum, by continuously modifying the time period at which trays are fed into the furnace in response to changing conditions, such as differences in the part assemblies to be brazed.

7 Claims, 3 Drawing Sheets

BRAZING FURNACE PARTS FEEDING CONTROL

BACKGROUND

This invention relates to roller-hearth brazing furnaces through which parts to be brazed are conveyed and brazed, and more particularly, to the method of controlling the timing of feeding parts into the furnace.

Roller-hearth brazing furnaces are used to braze components of a part assembly together, such as the blades or fins in a torque converter for an automatic transmission. The joints of the components to be brazed together are coated with a brazing compound, such as a copper based brazing compound. The part assembly is then passed through the brazing furnace which melts the copper in the copper brazing compound. The melted copper reflows into the joints of the components being brazed together and, as the copper cools and solidifies, brazes the components together.

A roller-hearth brazing furnace has an entry door, an outlet door, and a conveyer extending through a plurality of heating zones and a cool-down zone between the entry and outlet doors. One conventional brazing furnace has four heating zones and a cool-down zone. Trays of part assemblies, the components of which are to be brazed together, are successively fed into the furnace through the entry door and are continuously conveyed on the conveyor through the heating zones. As the trays of parts pass through the heating zones, the temperature of the parts is progressively raised in a known controlled manner to the melting point of copper, which flows into the joints of the elements of the parts to be brazed together. After leaving the last heating zone, the trays are conveyed through the cool-down zone, where the part assemblies are cooled in a known controlled manner, and exit the furnace through the exit door.

The trays of part assemblies are staged at the entry door of the furnace and successively fed into the furnace. One typical method of controlling the feeding of the trays into the furnace is to feed a tray of part assemblies into the furnace at fixed timed intervals. The timed interval, which typically can be adjusted, is set so that the furnace has the opportunity to recover after the tray enters the furnace.

A problem with using a fixed time interval to control the feeding of trays into the furnace is that it results in sub-optimum throughput due to different part assemblies being run through the furnace, or trays being less than fully loaded. The amount of time that it takes the furnace to recover after a tray is fed into the furnace through the entry door depends on the mass of the part assemblies on the tray. Consequently, when successive trays have different part assemblies, the total mass of the part assemblies on the successive trays differ. In order to ensure that the furnace has sufficient time to recover after a tray containing the most massive part assembly enters the furnace, the fixed time interval must be set at the time interval appropriate for the most massive part assembly. However, when a tray containing less massive part assemblies enters the furnace, the furnace recovers quicker than the fixed time interval and there is then a non-productive period where the furnace could accept another tray but one is not fed into the furnace until fixed time interval expires. A similar problem occurs when trays are less than fully loaded.

It is an object of this invention to improve the productivity of roller-hearth brazing furnaces by monitoring the recovery time of the furnace and adjusting the time interval at which trays are fed into the furnace to minimize the non-productive period.

SUMMARY

A method of controlling the feeding of part trays into a roller-hearth brazing furnace includes feeding a part tray into the furnace after the expiration of a time period. The temperatures in each heating zone of the furnace are monitored. After the expiration of the time period and before a part tray is fed into the furnace, these temperatures are compared to a specified temperature range for each zone. If all temperatures within the heating zones are within specification, the time period is decremented by a small amount. This process continues automatically until a temperature in a heating zone is not within specification when the time period expires. When this occurs, the time period is incremented by a small amount, which can be different from or the same as the amount used to decrement the time period. This method allows the furnace to run at higher throughput, approaching maximum, by continuously modifying the time period at which trays are fed into the furnace in response to changing conditions, such as differences in the part assemblies to be brazed.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which:

DETAILED DESCRIPTION

Figure 1:
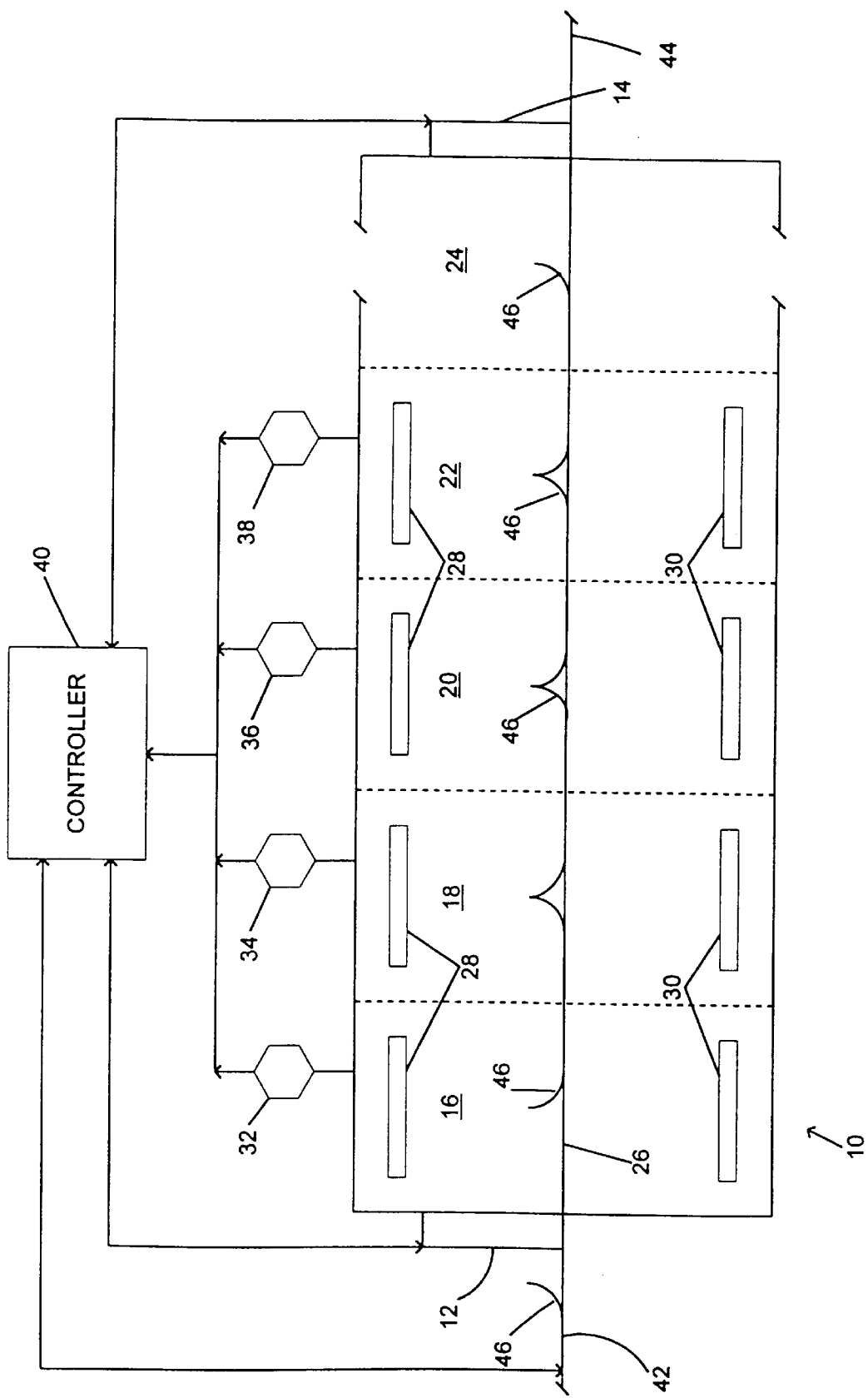
FIG. 1 is a schematic view of a roller-hearth brazing furnace.

Referring to FIG. 1, a roller-hearth brazing furnace 10 illustratively has an entry door 12, an outlet door 14, four heating zones 16, 18, 20, 22, and a cool-down zone 24. Furnace 10 also has a conveyor 26 extending between entry door 12 and outlet door 14. Each heating zone 16, 18, 20, 22 has heating elements 28, 30 disposed above and below conveyor 26.

Temperature sensors 32, 34, 36, 38 are coupled to heating zones 16, 18, 20, 22, respectively, generally at the end of each heating zone. Temperature sensors 32, 34, 36, 38 have outputs coupled to a controller 40. Controller 40 is also coupled to entry door 12 and to outlet door 14. An entry conveyor 42 is disposed at entry door 12 of furnace 10 and is controllably coupled to controller 40. An outlet conveyor 44 is disposed at the outlet door 14 of furnace 10. It should be understood that only the elements of furnace 10 and elements associated with furnace 10 necessary to describe the instant invention are specifically referenced and furnace 10 has other elements (some of which are not shown) that are constructed, operated and controlled in conventional fashion.

Figure 2A:
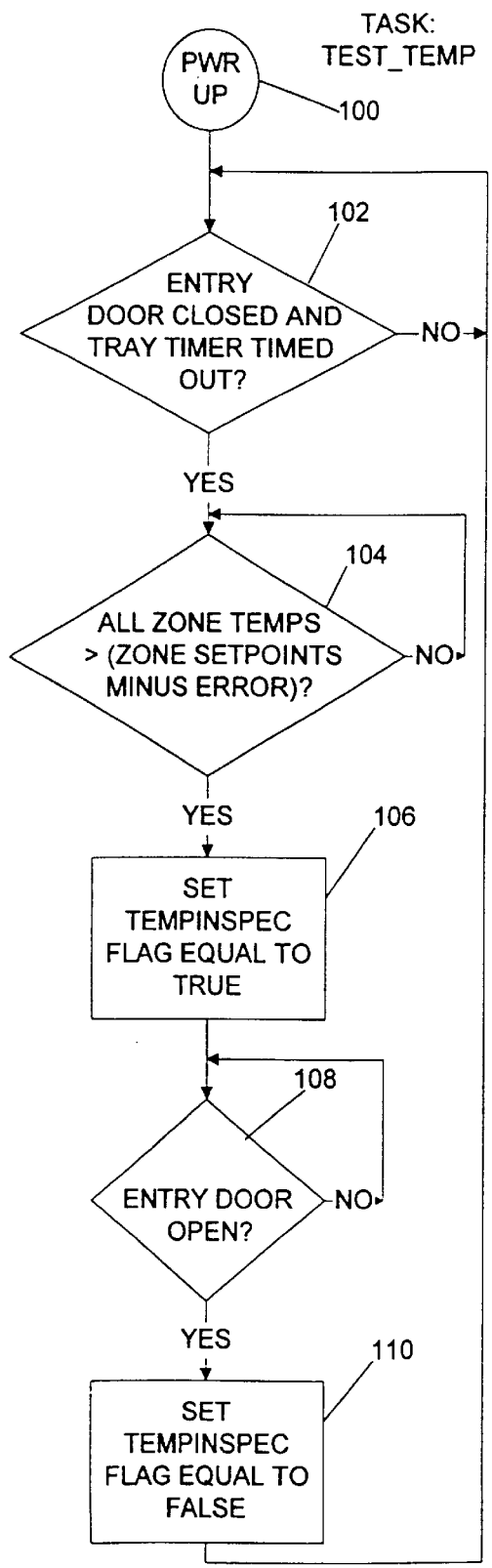
FIGS. 2A–2C are flow charts of the control methodology of the present invention.
Figure 2C:
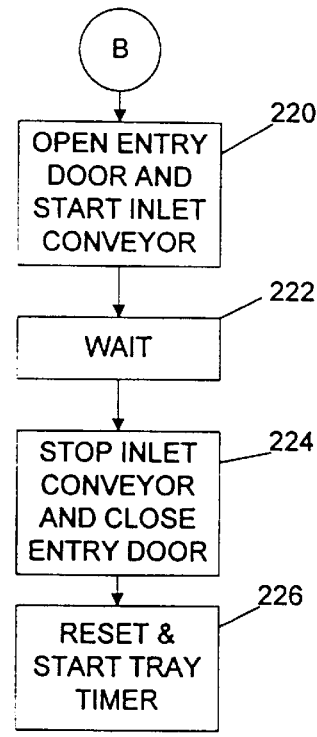
Figure 2B:
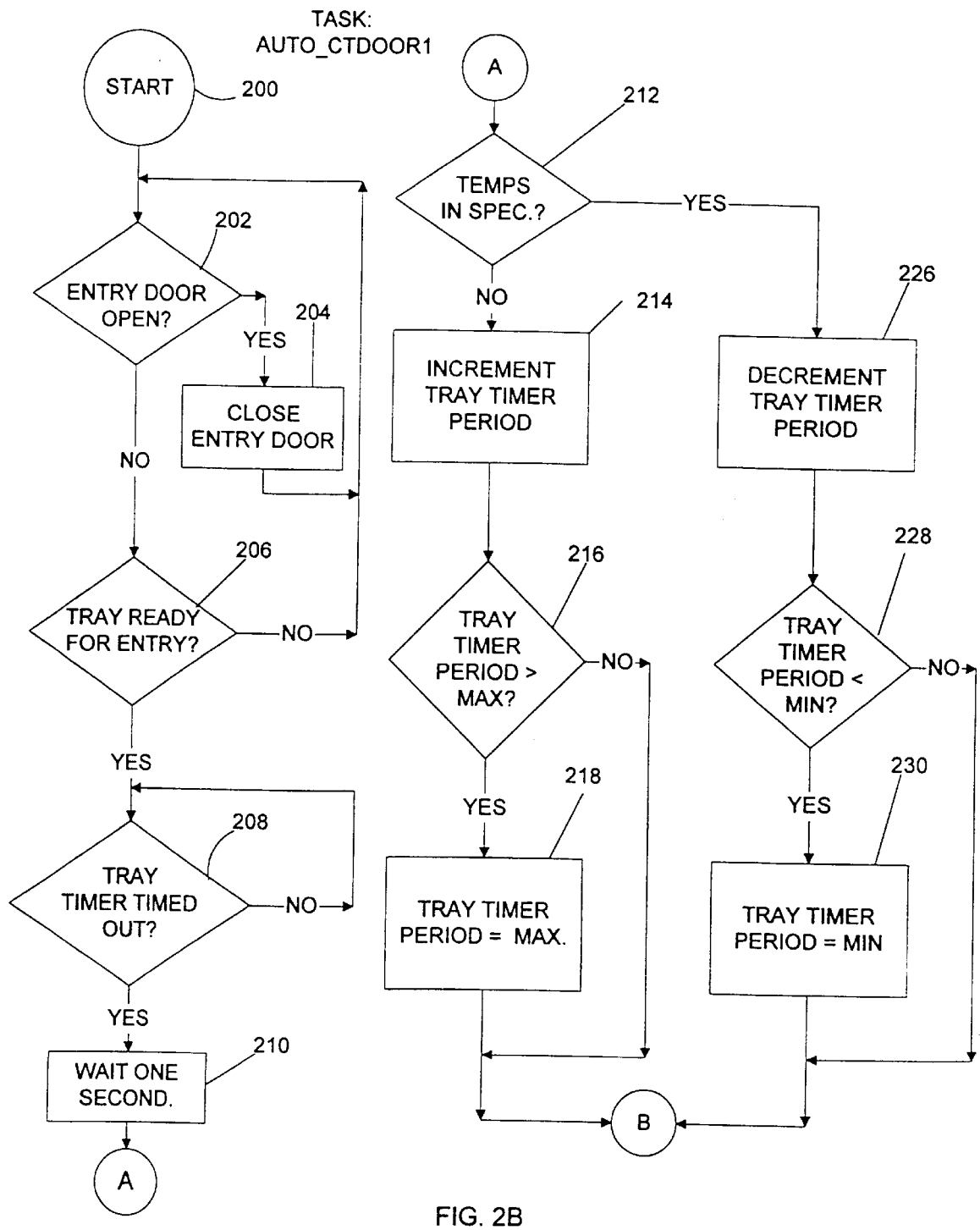

Referring to FIGS. 2A–2C, flow charts of the control methodology of the instant invention are shown. Illustratively, controller 40 is a state machine controller, such as a General Electric Series 90-70 PLC having a State Logic Processor. Referring to FIG. 2A, the temperature testing state task (Task: Test_Temp) is described. Starting at power up, step 100, a check is made at step 102 to determine whether entry door 12 is closed and the tray timer is timed out. If not, step 102 loops back on itself and again checks to determine whether entry door 12 is closed and the tray timer is timed out.

If entry door 12 is closed and the tray timer is timed out, step 104 checks to see if the temperatures in heating zones 16, 18, 20, 22 are within their respective specified ranges. If not, step 104 loops back on itself to check again. If so, the TempInSpec flag is set to True at step 106. Entry door 12 is next checked to see if it is open at step 108. If it is not, step 108 loops back on itself to check again. If entry door 12 is open, the TempInSpec flag is set equal to False at step 110 and the Test_Temp. state task returns to step 102.

Referring to FIG. 2B, the state task Auto_CTDoor1 is described. In this regard, due to the way in which state machine controllers operate, state tasks in effect run in parallel so the Auto_CTDoor1 state task is running in parallel with the Test_Temp. state task.

Auto_CTDoor1 state task begins at step 200 and checks to see if entry door 12 is open. If it is, step 204 closes the entry door 12. Once step 202 determines that entry door 12 is closed, step 206 checks to see if a parts tray 46 is waiting on entry conveyor 42 for entry into furnace 10 through entry door 12. If not, step 206 branches to step 202.

If a parts tray 46 is ready to enter furnace 10, step 208 determines whether the tray timer is timed out that is, the tray timer has reached the expiration of the time period for the tray timer. If not, step 208 loops back on itself and checks again. If the tray timer is timed out, step 210 waits one second and step 212 then checks to see if the temperatures in heating zones 16, 18, 20, 22 are within their respective specified ranges. If any heating zone 16, 28, 20, 22 temperature is not within its specified range, step 214 adds one time increment, illustratively one second, to the time period for the tray timer. Step 216 then checks to see if the time period for the tray timer has exceeded the maximum allowable value and if it has, step 218 sets the time period for the tray timer to the maximum allowable value. The maximum allowable value is selected based on the part assemblies being brazed. For example, for torque converters used in vehicles manufactured by Chrysler Corporation, the assignee of this invention, the maximum allowable value is illustratively 178 sec. The entry door 12 is then opened at step 220 and parts tray 46 waiting on inlet conveyor 42 is fed into furnace 10. After the expiration of the wait time at step 222 (illustratively seven seconds), inlet conveyor 42 is stopped and entry door 12 is closed at step 224, and the tray timer reset and started at step 226. Steps 220, 222 and 224 illustratively take approximately seventeen seconds to complete.

If step 212 determined that the heating zones 16, 18, 20, 22 temperatures were not outside their specified ranges, step 226 subtracts one time increment, illustratively one second, from the time period for the tray timer. Step 228 checks whether the time period for the tray timer is less than the minimum allowable value and if it is, step 230 sets the time period for the tray timer to the minimum allowable value. The minimum allowable value is selected based on the part assemblies being brazed. For example, for torque converters used in vehicles manufactured by Chrysler Corporation, the assignee of this invention, the minimum allowable value is illustratively 148 sec. (It should be understood that the maximum and minimum allowable values are programmable values that are entered into controller 40 and can thus be altered as appropriate.)

The entry door is then opened at step 220 and a parts tray 46 fed into furnace 10. After the expiration of the wait time at step 222 (illustratively seven seconds), inlet conveyor 42 is stopped and entry door 12 is closed at step 224, and the tray timer reset and started at step 226. Steps 220, 222 and 224 illustratively take approximately seventeen seconds to complete.

Although the invention has been described in detail with reference to certain preferred embodiments and specific examples, variations and modifications exist within the scope and spirit of the invention as defined in the following claims.

What is claimed is:

1. A method of optimizing the feeding of parts into a brazing furnace having a plurality of heating zones comprising the steps of:
   a. feeding the parts into the furnace at the expiry of a time period;
   b. determining whether the temperatures in the heating zones were within temperature range specifications for the respective heating zones after expiry of the time period and prior to feeding the parts into the brazing furnace;
   c. increasing the time period if at least one heating zone temperature was not within its temperature specification range; and
   d. decreasing the time period if the all heating zone temperatures were within their respective temperature range specifications.

2. The method of claim 1 wherein the step of feeding the parts into the furnace comprises feeding a parts tray holding the parts into the furnace, the method further including the step of timing the time period with a tray timer and the steps of incrementing the time period and decrementing the time period comprise incrementing and decrementing the time period timed by the tray timer.

3. The method of claim 1 wherein the steps of decrementing the time period and incrementing the time period include not allowing the time period to be less than a minimum allowable value and not allowing the time period to be greater than a maximum allowable value, respectively.

4. The method of claim 2 and further including the step of comparing the new time period for the tray timer to a minimum allowable value after decrementing the time period and setting the time period to the minimum allowable value if the new time period is less than the minimum allowable value.

5. The method of claim 2 and further including the step of comparing the new time period for the tray timer to a maximum allowable value after incrementing the time period and setting the time period to the maximum allowable value if the new time period is greater than the maximum allowable value.

6. The method of claim 2 wherein the step of decrementing the time period includes the step of comparing the new time period for the tray timer to a minimum allowable value after decrementing the time period and setting the time period to the minimum allowable value if the new time period is less than the minimum allowable value, the step of incrementing the time period includes the step of comparing the new time period for the tray timer to a maximum allowable value after incrementing the time period and setting the time period to the maximum allowable value if the new time period is greater than the maximum allowable value, and the steps of decrementing and incrementing the time period decrement and increment the time period by one second, respectively.

7. A method of optimizing the feeding of parts into a brazing furnace having a plurality of heating zones comprising the steps of:
   a. feeding the parts into the furnace at the expiry of a time period;
   b. monitoring the recovery of the furnace after the parts are fed into the furnace at the expiry of the time period;
   c. decrementing the time period if the furnace has recovered before the expiry of the time period; and
   d. incrementing the time period if the furnace has not recovered before the expiry of the time period.

* * * * *